United States Patent
Prasad

(10) Patent No.: US 9,652,360 B2
(45) Date of Patent: May 16, 2017

(54) CRAWLING FOR EXTRACTING A MODEL OF A GUI-BASED APPLICATION

(71) Applicant: FUJITSU LIMITED, Kawasaki-shi, Kanagawa (JP)

(72) Inventor: Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 464 days.

(21) Appl. No.: 14/245,741

(22) Filed: Apr. 4, 2014

(65) Prior Publication Data

US 2015/0286355 A1    Oct. 8, 2015

(51) Int. Cl.
*G06F 17/30*    (2006.01)
*G06F 11/36*    (2006.01)

(52) U.S. Cl.
CPC ...... *G06F 11/3608* (2013.01); *G06F 11/3668* (2013.01)

(58) Field of Classification Search
CPC ... G06F 11/3608; G06F 11/3668; G06F 9/444
See application file for complete search history.

(56) References Cited

U.S. PATENT DOCUMENTS

| | | | |
|---|---|---|---|
| 7,046,848 B1 * | 5/2006 | Olcott | G06K 9/00442 382/176 |
| 8,683,494 B1 | 3/2014 | Prasad et al. | |
| 2006/0235548 A1 * | 10/2006 | Gaudette | G06F 8/34 700/83 |
| 2008/0270101 A1 * | 10/2008 | Salmela | G06F 8/10 703/17 |
| 2011/0078556 A1 * | 3/2011 | Prasad | G06F 9/4443 715/234 |
| 2014/0052433 A1 | 2/2014 | Prasad et al. | |
| 2014/0201126 A1 * | 7/2014 | Zadeh | G06K 9/627 706/52 |
| 2015/0082207 A1 | 3/2015 | Prasad | |

OTHER PUBLICATIONS

Mirzaei et al, "EvoDroid: Segmented Evolutionary Testing of Android Apps," ACM FSE '14, Nov. 16, 2014.

(Continued)

*Primary Examiner* — Leslie Wong
(74) *Attorney, Agent, or Firm* — Maschoff Brennan

(57) ABSTRACT

A method of crawling a graphical user interface (GUI) based application may include performing a first-time crawl of a first sequence of actions of the GUI-based application. The first-time crawl may be a first time that the first sequence of actions is crawled. Further, the first sequence of actions may be a prefix of a second sequence of actions that includes one or more additional actions than the first sequence of actions. The method may also include extending the first-time crawl by the one or more additional actions such that the second sequence of actions is crawled during the first-time crawl. Further, the method may include determining a first input/output sequence associated with the first sequence of actions based on the first-time crawl. Additionally, the method may include determining a second input/output sequence associated with the second sequence of actions based on the first-time crawl.

20 Claims, 10 Drawing Sheets

(56) References Cited

OTHER PUBLICATIONS

F. J. Ocariza, K. Pattabiraman, and A. Mesbah. AutoFLox: An automatic fault localizer for client-side JavaScript. In Proceedings of the 5th IEEE International Conference on Software Testing, Verification and Validation (ICST'12), pp. 31-40. IEEE Computer Society, 2012.
Atif M. Memon, et al., the first Decade of GUI ripping: Reverse engineering of graphical user interfaces for testing. In Proc. of The 10th Working Conference on Reverse Engineering, Nov. 2003.
Choi et al., "Guided GUI Testing of Android Apps with Minimal Restart and Approximate Learning" OOPSLA ' Oct. 29-31, 2013.
C. Y. Cho, D. Babrc, P. Poosankam, K. Z. Chen, E. X. Wu, and D. Song. MACE: Modelinference-assisted concolic exploration for protocol and vulnerability discovery. In USENIXSecurity Symposium, 2011.
Matko Botinaan et al., "Sigma*: Symbolic Learning of Input-Output Specifications" POPL, p. 443-456. ACM, (2013).
D. Giannakopoulou, Z. Rakamaric, and V. Raman. Symbolic learning of component interfaces. In 19th Int. Symp. on Static Analysis, pp. 248-264, 2012.

* cited by examiner

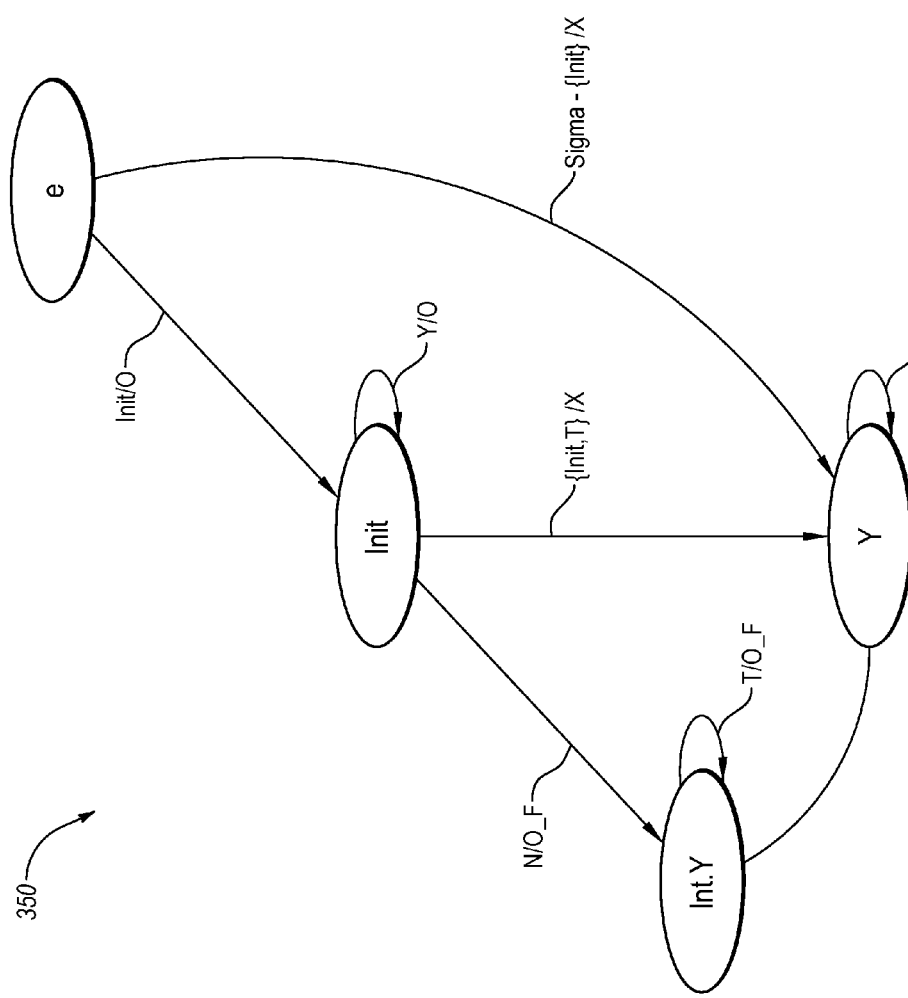

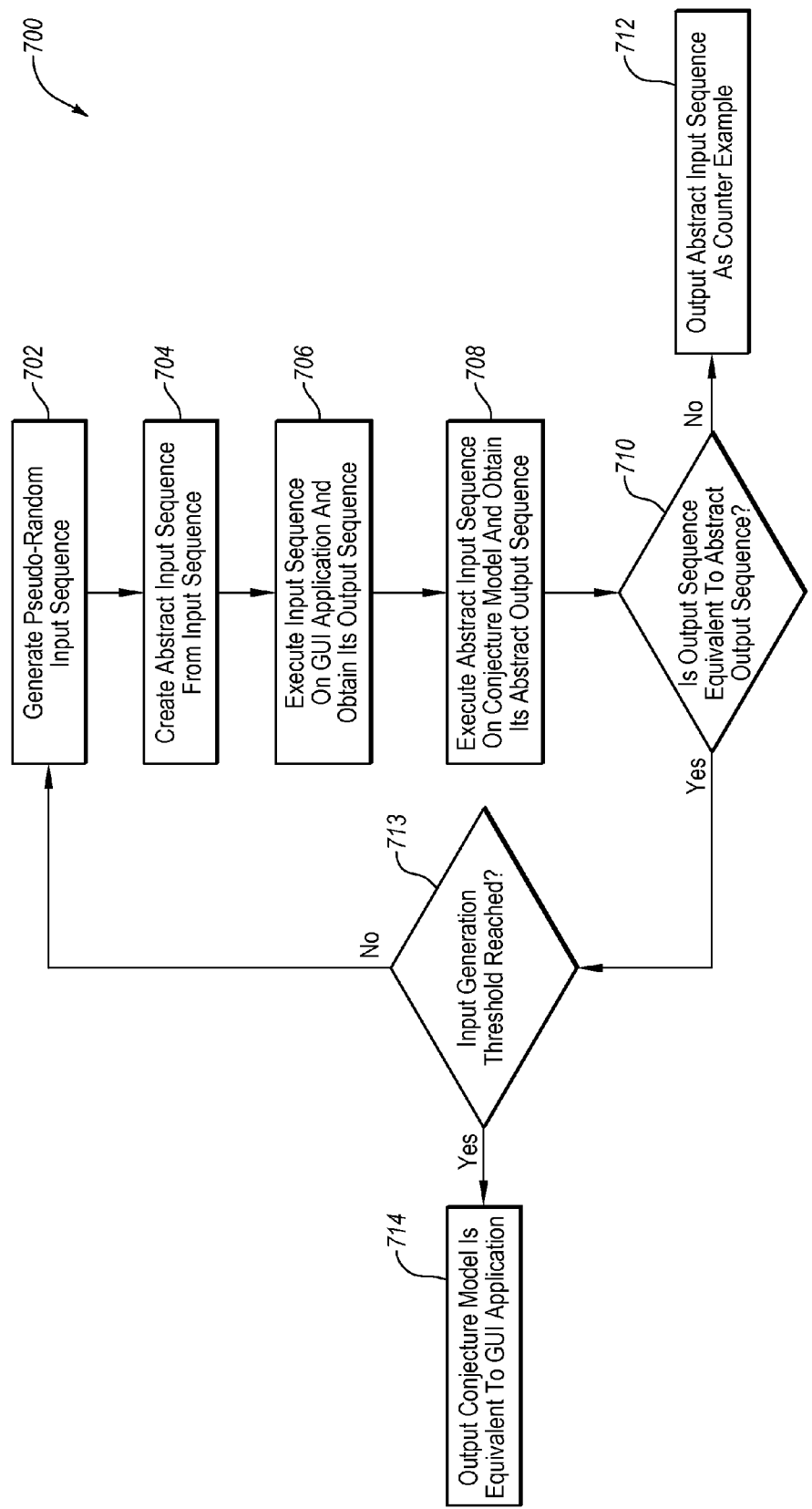

CRAWLING FOR EXTRACTING A MODEL OF A GUI-BASED APPLICATION

FIELD

The embodiments discussed herein are related to crawling for extracting a model of a graphical user interface (GUI) based application.

BACKGROUND

Graphical user interface (GUI) based applications for electronic devices, such as mobile applications for mobile devices, are becoming increasingly common. Many GUI-based applications execute actions based on actions performed on a graphical user interface via a touchscreen, which may ease use of the GUI-based applications. However, the GUI and touchscreen interface of the GUI-based applications also provide challenges in assessing the behavior of the GUI-based applications.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of crawling a graphical user interface (GUI) based application may include performing a first-time crawl of a first sequence of actions of the GUI-based application. The first-time crawl may be a first time that the first sequence of actions is crawled. Further, the first sequence of actions may be a prefix of a second sequence of actions that includes one or more additional actions than the first sequence of actions. The method may also include extending the first-time crawl by the one or more additional actions such that the second sequence of actions is crawled during the first-time crawl. Further, the method may include determining a first input/output sequence associated with the first sequence of actions based on the first-time crawl. Additionally, the method may include determining a second input/output sequence associated with the second sequence of actions based on the first-time crawl.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3B illustrates an example DFSM conjecture model that may be generated using the method of FIG. 3A;

FIG. 7 is a flowchart of an example method of determining whether a conjecture model sufficiently models an associated GUI-based application.

DESCRIPTION OF EMBODIMENTS

Figure 1:
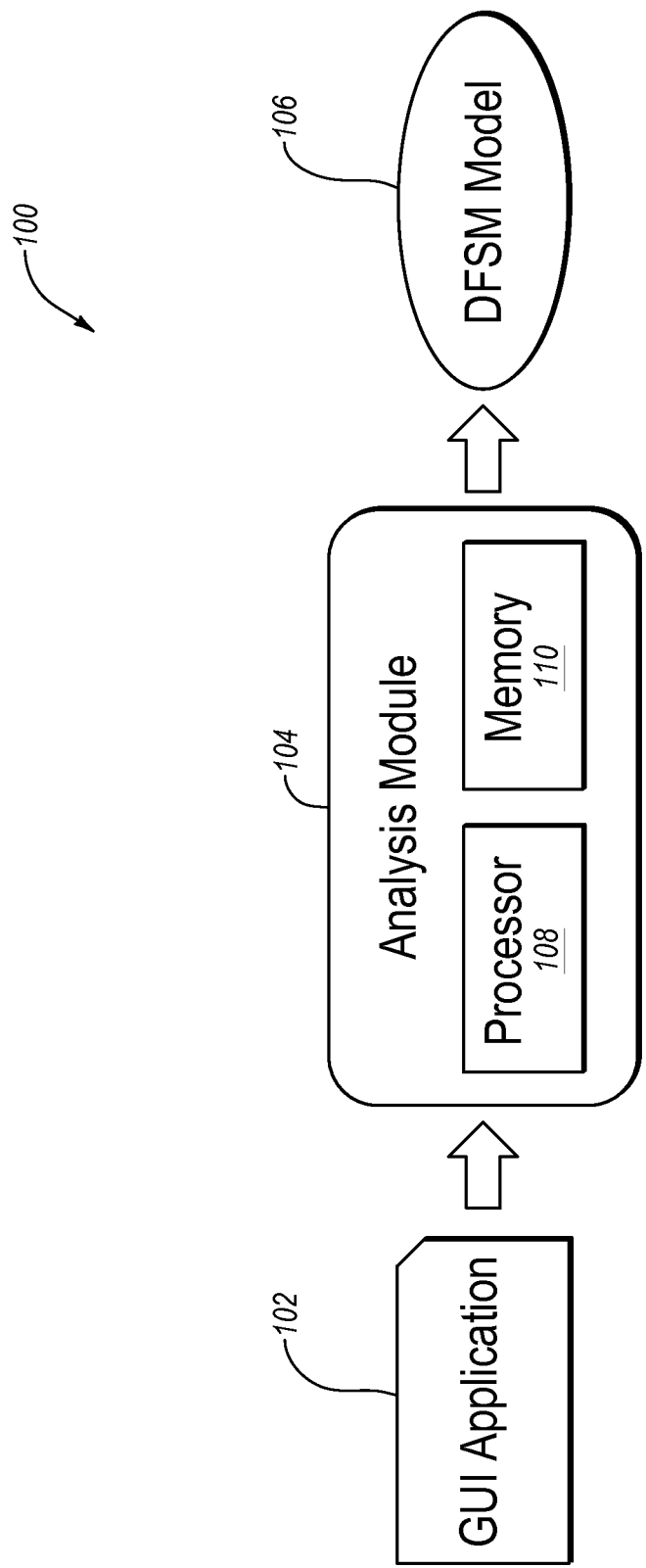
FIG. 1 illustrates an example system of generating a model of a GUI-based application.

As discussed in further detail below, some embodiments of the present disclosure may include an analysis module configured to perform crawling of a graphical user interface (GUI) based application (referred to hereinafter as a "GUI-based application"). The analysis module may be configured to perform the crawling to learn behavior of the GUI-based application such as input/output sequences of the GUI based application. The analysis module may be configured to perform the crawling in a manner that may reduce redundant and/or on-demand crawling of the GUI-based application. For example, as detailed below, the analysis module may be configured to crawl the GUI-based application in a manner that reduces or eliminates separately crawling a first sequence of actions and a second sequence of actions that is an extension of the first sequence of actions. Therefore, behavior of the GUI-based application associated with the first sequence of actions and associated with the second sequence of actions (e.g., input/output sequences associated with the first sequence of actions and the second sequence of actions) may be determined from the same crawl.

In contrast, traditional crawling methods may crawl the first sequence of actions during one crawl and then may crawl the second sequence of actions during a separate crawl. Therefore, the separate crawl performed for the second sequence of actions in traditional crawling may redundantly crawl the first sequence of actions again. Accordingly, the analysis module may be configured to crawl the GUI-based application in a manner that may reduce redundant crawling as compared to other crawling methods.

In the present disclosure, a sequence of actions that is included in an extended sequence of actions may be referred to as a "prefix" of the extended sequence of actions. For example, the first sequence of actions discussed above may be referred to as a prefix of the second sequence of actions. Additionally, a sequence of actions may include any number of prefixes depending on the length of the sequence of actions. For example, a sequence of actions "A.B.C.D" may have "A" as a prefix, "A.B" as a prefix, and "A.B.C" as another prefix.

As also explained below, the analysis module may be configured to use the crawling described herein in conjunction with generating a deterministic finite-state machine model (referred to hereinafter as a "DFSM model") such as a Mealy Machine model of the GUI-based application. The DFSM model may indicate the behavior of the GUI-based application. In some embodiments, the DFSM model may be used during development and testing of the GUI-based application. In such instances, the DFSM model may be used to determine whether or not the GUI-based application includes the functionality and features as expected or desired by the developer of the GUI-based application. The DFSM model may thus be used to identify one or more features of the GUI-based application that may not function as desired such that the features may accordingly be modified so the GUI-based application functions as desired. Therefore, a design of the GUI-based application may be modified based on the DFSM model to aid in model-driven development (MDD) and model-based testing (MBT) of the GUI-based application.

Embodiments of the present disclosure are explained with reference to the accompanying drawings.

FIG. 1 illustrates an example system 100 of generating a DFSM model of a GUI-based application 102, arranged in accordance with at least one embodiment of the present disclosure. The GUI-based application 102 may be any suitable GUI-based application that may be included on an electronic device. The electronic device may include, but is not limited to, a tablet computer, a smartphone, a navigation system, an entertainment system, a desktop computer, a laptop computer, a digital music player, etc.

The GUI-based application 102 may include one or more distinct GUI components, each associated with a particular view of the GUI-based application 102 (referred to hereinafter as "views") that may be executed in a mutually exclusive fashion and that may each be associated with at least some of the actions performed by the GUI-based application 102. Examples of views of a GUI-based application are illustrated below in FIG. 2A.

Each view of the GUI-based application 102 may be associated with one or more distinct screens, where each screen may support at least a portion of the actions of the GUI-based application 102 as well as represent the response of the GUI-based application 102 to one or more actions on a screen. To support at least a portion of the actions of the GUI-based application 102, each screen may include one or more widgets. Each widget may be configured to execute one or more of the actions of the GUI-based application 102 based on one or more actions performed by a user with respect to the widget. For example, a widget may be displayed as a button on the GUI of the GUI-based application 102 and may be configured to execute a first action based on a tap of the widget via a touchscreen of a mobile device. The same widget may be configured to execute a second action based on a long tap or some other action performed on the widget via the touchscreen. Additionally, in some instances an entire screen may be configured as a widget. For example, a swipe of a screen may cause the GUI-based application 102 to transition to another screen. Example screens of views of a GUI-based application are also illustrated below in FIG. 2A.

Each screen may additionally be associated with one or more states of the GUI-based application 102. In some embodiments, the state of the GUI-based application 102 associated with a screen may be based on the state of the one or more widgets associated with the screen. The state of a widget may be represented by the values of one more attributes describing the widget. For example, different states of a widget may be based on whether the widget is enabled or disabled, visible or not visible, opaque or not opaque, etc. Therefore, the GUI-based application 102 may include multiple states associated with a particular screen based on the number of states of widgets that may be associated with the screen.

The state of the GUI-based application 102 associated with a screen may also be influenced by previous states or screens that were reached prior to reaching the screen. For example, in some instances a particular screen may be reached from a first previous screen and a second previous screen. Accordingly, in some embodiments, the GUI-based application 102 may include a state associated with the particular screen that is related to reaching the particular screen from the first previous screen and may include another state associated with the particular screen that is related to reaching the particular screen from the second previous screen. Similarly, in these or other embodiments, the performance of an action "A" on the particular screen may result in a transition to a first subsequent screen in some instances and, in other instances, performance of the action "A" on the particular screen may result in a transition to a second subsequent screen. Therefore, in some embodiments, the GUI-based application 102 may include a state associated with the particular screen that is related to reaching the first subsequent screen based on the action "A" and may include another state associated with the particular screen that is related to reaching the second subsequent screen based on the action "A." As discussed in further detail below, the outputs of actions performed on screens of the GUI-based application 102 may be associated with different states of the GUI-based application 102.

As mentioned above, FIG. 2A illustrates example views and screens of a GUI-based application 202 with an End User License Agreement (EULA) component, arranged in accordance with at least some embodiments described herein. The application 202 may be referred to hereinafter as the "sample application 202." As indicated above, the sample application 202 may include a EULA that may include a series of terms that the user may be required to accept before being able to use the sample application 202. For illustrative purposes and simplicity, the functionality of the sample application 202 is described with respect to performance of the sample application 202 associated with the user accepting or not accepting different terms of the EULA. Accordingly, functionality and states of the sample application 202 with respect to actions of the sample application 202 when the license terms have or have not been accepted are respectively simplified as a main operating state of the sample application 202 and an agreement non-acceptance operating state of the sample application 202.

For example, the sample application 202 is illustrated as including a first-term view 204 that may be associated with accepting a first license term of the EULA; a second-term view 206 associated with accepting a second license term of the EULA; and a third-term view 208 associated with accepting a third license term of the EULA. The sample application 202 is also illustrated as including a main actions view 210 that may represent one or more views of the sample application 202 that may be associated with main actions of the sample application 202 that may be associated with the sample application 202 after the first, second, and third terms of the EULA have been accepted. Additionally, the sample application 202 is illustrated as including an agreement non-acceptance view 212 that may represent one or more views of the sample application 202 that may be associated with actions of the sample application 202 when one or more of the license terms of the EULA are not accepted. As indicated above, the specific example of the sample application 202 described herein is for illustrative and exemplary purposes only. Accordingly, the sample application 202 may have any number of additional views and actions than those explicitly illustrated and described.

The sample application 202 may also include screens that may be associated with the views 204, 206, 208, 210, and 212. For example, the sample application 202 may include a first-term screen 214 that may be associated with the first-term view 204, a second-term screen 216 that may be associated with the second-term view 206, a third-term screen 218 that may be associated with the third-term view 208. The sample application 202 is also illustrated as including a main actions screen 220 that may represent one or more screens of the sample application 202 associated with the main actions of the sample application 202. Similarly, the sample application 202 is illustrated as including an agreement non-acceptance screen 222 that may represent one or more screens of the sample application 202 associated with actions of the sample application 202 when one or more terms of the EULA are not accepted.

In the illustrated embodiment, the sample application 202 may open to the first-term screen 214 in response to a user launching the sample application 202. The first-term screen 214 may include one or more widgets associated with accepting the first license term of the EULA. For example, the first-term screen 214 may include a "Yes" widget 224 configured such that when a user taps an associated "Yes" button (indicating acceptance of the first license term), the sample application 202 transitions to the second-term screen 216 and the second-term view 206. The first-term screen 214 may also include a "No" widget 226 configured such that when the user taps an associated "No" button (indicating non-acceptance of the second license term), the sample application 202 transitions to a non-acceptance screen and view, as represented by the non-acceptance screen 222 and associated non-acceptance view 212.

Similarly, the second-term screen 216 may include a "Yes" widget 228 configured such that when a user taps an associated "Yes" button (indicating acceptance of the second license term), the sample application 202 transitions to the third-term screen 218 and the third-term view 208. The second-term screen 216 may also include a "No" widget 230 configured such that when the user taps an associated "No" button (indicating non-acceptance of the second license term), the sample application 202 transitions to a non-acceptance screen and view, as represented by the non-acceptance screen 222 and associated non-acceptance view 212.

Correspondingly, the third-term screen 218 may include a "Yes" widget 232 configured such that when a user taps an associated "Yes" button (indicating acceptance of the third license term), the sample application 202 transitions to a main actions screen and main actions view, as represented by the main actions screen 220 and the main actions view 210. The third-term screen 218 may also include a "No" widget 234 configured such that when the user taps an associated "No" button (indicating non-acceptance of the third license term), the sample application 202 transitions to a non-acceptance screen and view, as represented by the non-acceptance screen 222 and the associated non-acceptance view 212.

Figure 2A:
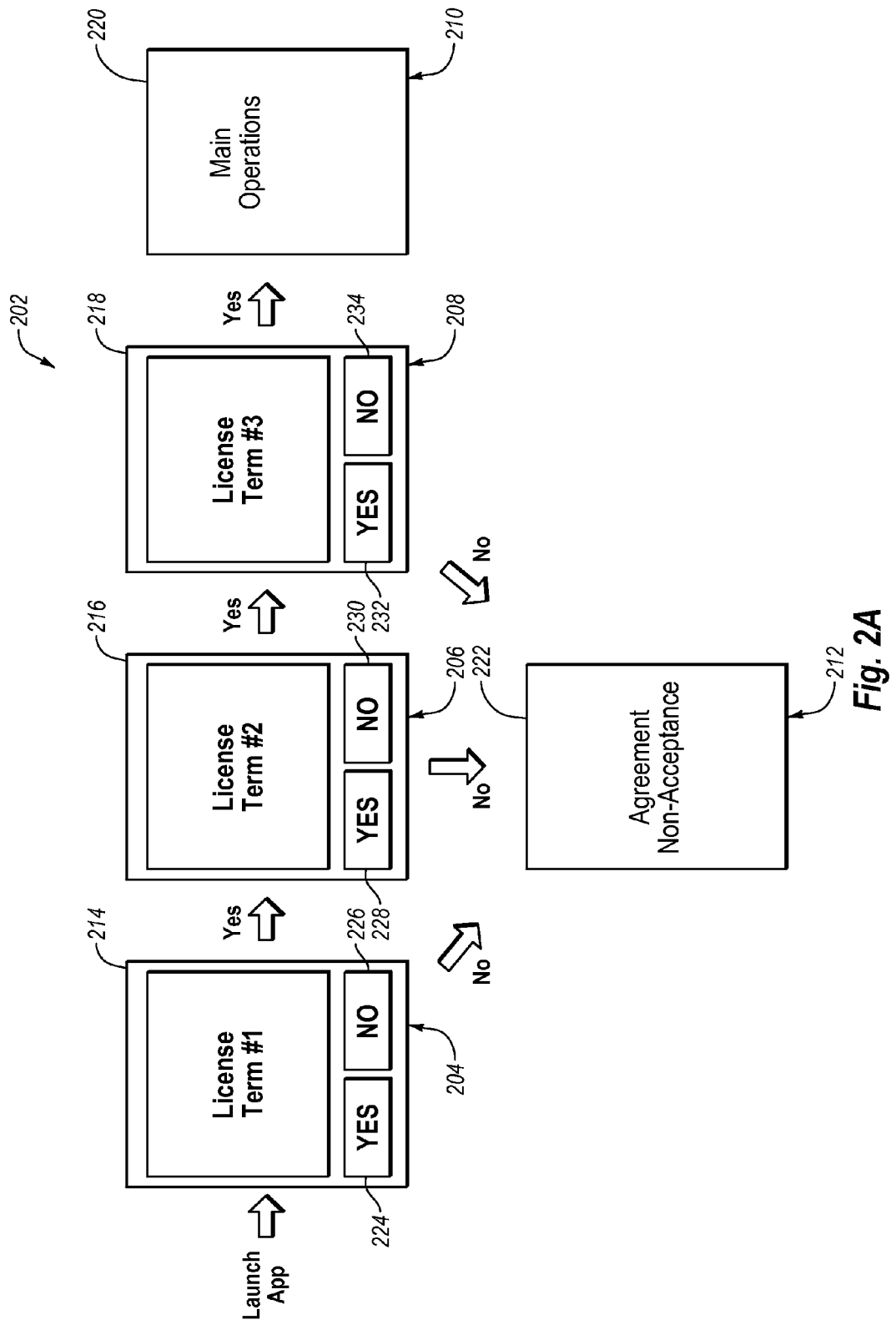
FIG. 2A illustrates example views and screens of a GUI-based application.

Modifications may be made to FIG. 2A without departing from the scope of the present disclosure. For example, although not specifically described or illustrated, the one or more screens represented by the main actions screen 220 may also include one or more widgets that may cause the sample application 202 to perform one or more associated actions. Similarly, the one or more screens represented by the agreement non-acceptance screen 222 may also include one or more widgets that may cause the sample application 202 to perform one or more associated actions. Further, the sample application 202 may include any number of other functions, views, screens, and/or widgets. The specific examples are merely to aid in explanation and are not limiting.

Returning to FIG. 1, in some instances, an action executed with respect to a widget may result in an output of the GUI-based application 102 where the GUI-based application 102 may transition from one state of the GUI-based application 102 to another state of the GUI-based application 102. The transition may be between states associated with the same screen and view, states associated with different screens included with the same view, and/or states associated with different screens that may be included in different views.

Figure 2B:
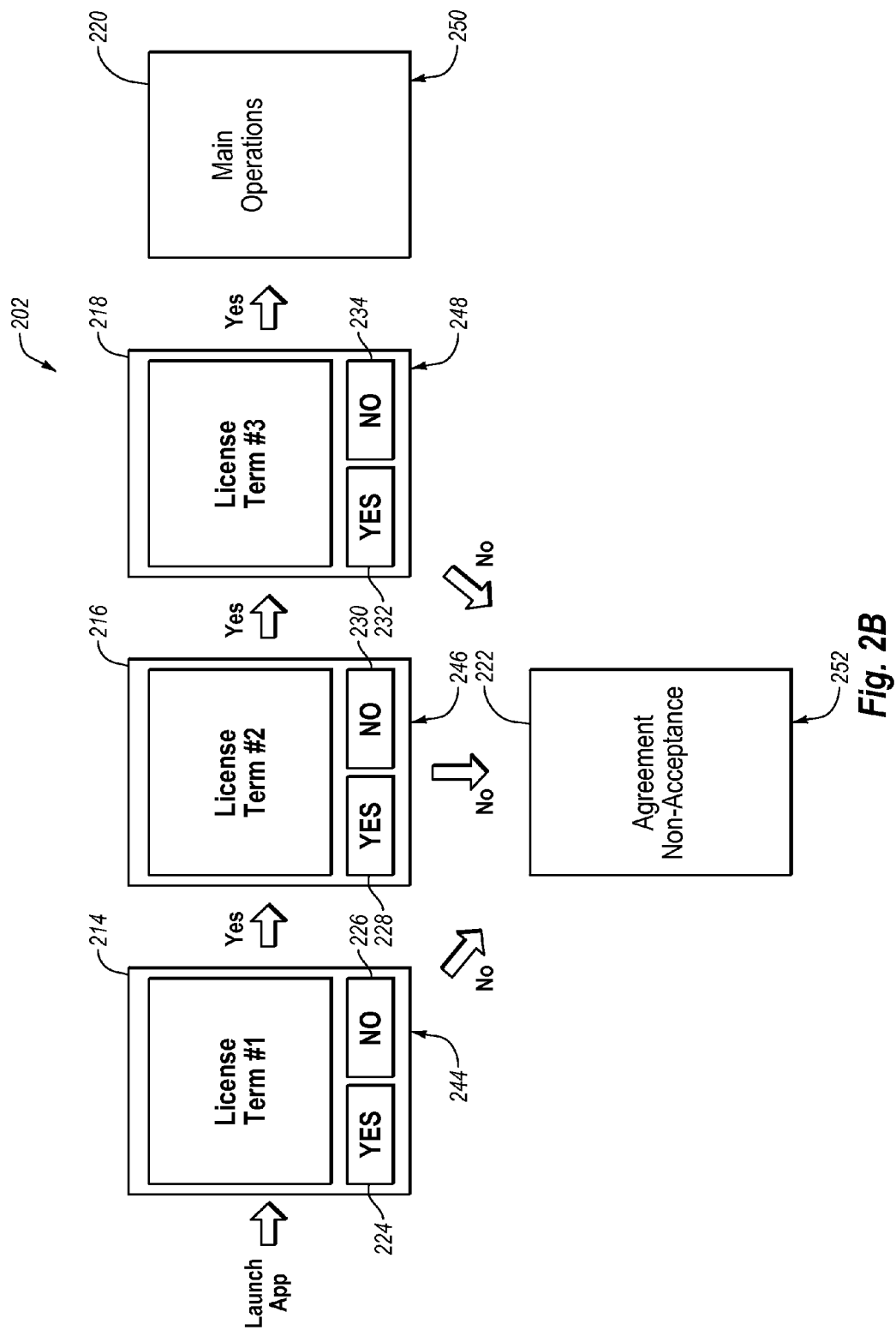
FIG. 2B illustrates example transitions between states associated with the GUI-based application of FIG. 2A.

FIG. 2B illustrates example transitions between states associated with the sample application 202 of FIG. 2A, in accordance with at least one embodiment of the present disclosure. In the illustrated embodiment, the sample application 202 may include a first-term state 244 associated with the first-term screen 214, a second-term state 246 associated with the second screen 216 and a third-term state 248 associated with the third-term screen 218. Further, the main actions of the sample application 202 may be represented by a main actions state 250 in the illustrated embodiment. Additionally, the actions of the sample application 202 when one or more of the license terms of the EULA is not agreed to may be represented by an agreement non-acceptance state 252.

The sample application 202 may open to the first-term screen 214 and the first-term state 244 in response to a user launching the sample application 202. The sample application 202 may transition from the first-term state 244 to the second-term screen 216 and the associated second-term state 246 in response to the user tapping the "Yes" button associated with the "Yes" widget 224 of the first-term screen 214. The sample application 202 may transition from the first-term state 244 to the non-acceptance state 252 and an associated non-acceptance screen 222 in response to the user tapping a "No" button associated with the "No" widget 226 of the first-term screen 214.

The sample application 202 may transition from the second-term state 246 to the third-term screen 218 and the associated third-term state 248 in response to the user tapping the "Yes" button associated with the "Yes" widget 228 of the second-term screen 216. The sample application 202 may transition from the second-term state 246 to the non-acceptance state 252 and the associated non-acceptance screen 222 in response to the user tapping a "No" button associated with the "No" widget 230 of the second-term screen 216.

The sample application 202 may transition from the third-term state 248 to the main actions state 250 and an associated main actions screen 220 in response to the user tapping the "Yes" button associated with the "Yes" widget 232 of the third-term screen 218. The sample application 202 may transition from the third-term state 248 to the non-acceptance state 252 and the associated non-acceptance screen 222 in response to the user tapping a "No" button associated with the "No" widget 234 of the third-term screen 218.

Returning to FIG. 1, the GUI-based application 102 may be configured to be received by an analysis module 104 that may be configured to generate a DFSM model 106 of the GUI-based application 102. In some embodiments, the analysis module 104 may include a processor 108 and memory 110. The processor 108 may be any suitable special-purpose or general-purpose computer, computing entity, or processing device including various computer hardware or software modules and may be configured to execute instructions stored on any applicable computer-readable media. For example, the processor 108 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, it is understood that the processor 108 may include any number of processors configured to perform any number of operations.

The memory 110 may include computer-readable media for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media. Computer-executable instructions may include, for example, instructions and data which cause the processor 108 to perform a certain function or group of functions.

In some embodiments, the analysis module 104 may be configured to generate the DFSM model 106 as a Mealy Machine model that represents the behavior of the GUI-based application 102. For example, in some embodiments, the analysis module 104 may be configured to generate, as the DFSM model 106, a Mealy Machine model for the sample application 202 of FIGS. 2A and 2B, which may model the behavior of the sample application 202 as described with respect to FIG. 2B.

In some embodiments, the analysis module 104 may be configured to generate the DFSM model 106 using dynamic crawling and a known active-learning algorithm that is referred to as the L* algorithm or different variants thereof. In general, the L*algorithm is an algorithm that examines input/output (I/O) sequences associated with a system under test (e.g., the GUI-based application 102) in a manner that a finite state model of the system under test that is consistent with the observed I/O sequences may be generated by the L* algorithm. In some embodiments, a specific variant of the L* algorithm may be employed to learn a Mealy Machine model of the system, whose output values may be determined based on the current state and input values.

Typically the L* algorithm and associated DFSM models are useful for determining and modeling behavior of finite-state systems with finite input and output domains. However, GUI-based applications (e.g., the GUI-based application 102) typically are not naturally finite-state type of systems. Accordingly, the analysis module 104 may be configured to model the GUI-based application 102 in a manner that the GUI-based application 102 may be represented as a finite-state system to allow for use of the L* algorithm.

In some embodiments, the analysis module 104 may be configured to perform an abstraction to model input and output data as input and output types instead of the actual data. Such abstraction may allow for a finite number of states in instances where there may be infinite possibilities for the input and/or output data. Therefore, the abstraction may model the GUI-based application 102 in a manner that the GUI-based application 102 may be represented as a finite-state system, when it otherwise may not. Further description of the abstraction performed as well as other information regarding use of the L* algorithm in modeling GUI-based applications is found in U.S. patent application Ser. No. 14/027,017, entitled "EXTRACTING A DETERMINISTIC FINITE-STATE MACHINE MODEL OF A GUI-BASED APPLICATION" and filed on Sep. 13, 2013, the entire contents of which are herein incorporated by reference in their entirety.

The L* algorithm may also work based on the assumption that all actions and commands associated with the system under test—e.g., the GUI-based application 102—may be available in all states of the system under test. However, this may not be the case with GUI-based applications. To address this issue, the analysis module 104 may be configured to extend the true behavior of the GUI-based application to make it suitable for analysis through L* by generating a dummy state and dummy output for the GUI-based application 102 that may act as an error state and error output where actions that may be unavailable at a particular state may produce the error output and that may result in a transition to the error state. Accordingly, the GUI-based application 102 may be modeled such that all the actions associated with the GUI-based application 102 may be modeled as being available in every state of the GUI-based application 102 even when the actions may, in fact, be unavailable for particular screens and states.

For example, the following actions may be performed with respect to the sample application 202 of FIGS. 2A and 2B: tapping on an icon associated with the sample application 202 to launch the sample application 202 (referred to hereinafter as "Init"), tapping the "Yes" button (referred to hereinafter as "Y") associated with one of the "Yes" widgets 224, 228, and 232, and tapping the "No" button (referred to hereinafter as "N") associated with one of the "No" widgets 226, 230, and 234. Other actions associated with the main action screens 220 or the agreement non-acceptance screens 222 of the sample application 202 may be abstracted away for simplifying the sample application 202 in the present example. The other actions may be represented by "T" in the foregoing description. All of these actions may not be available on every screen or in every state. For example, the "Init" and "T" actions may not be available on the first-term screen 214 in the first-term state 244.

To allow for use of the L* algorithm and generation of the DFSM model with respect to the sample application 202, a dummy error state and a dummy error output may be generated for the sample application 202 such that transitions and their associated outputs in the sample application 202 that may not actually be possible because of the unavailability of actions in a particular state may be captured by the dummy error state and the dummy error output. For example, performance of the unavailable actions "Init" and "T" on the first-term screen 214 in the first-term state 244 may be modeled as having responses that produce the dummy error output and result in a transition from the first-term state 244 to the dummy error state. Accordingly, the unavailable actions "Init" and "T" may be modeled as being available on the first-term screen 214 in the first-term state 244 even though they may not actually be available on the first-term screen 214 in the first-term state 244.

Returning to FIG. 1, the L* algorithm may also be traditionally configured such that the L* algorithm begins at an initial state associated with the system under test—e.g., the GUI-based application 102—where the initial state may be the same state each time. However, in some instances, a GUI-based application (e.g., the GUI-based application 102) may include more than one initial state. Accordingly, to allow for use of the L* algorithm with respect to the GUI-based application 102, the analysis module 104 may generate a dummy initial state for the GUI-based application 102. The analysis module 104 may be configured to model the GUI-based application 102 as beginning at an actual initial state by modeling a transition from the dummy initial state to the actual initial state as a response to a dummy input action in the dummy initial state.

For example, the analysis module 104 may generate a dummy initial state for the GUI-based application 102 when the GUI-based application 102 may include a first initial state and a second initial state. The analysis module 104 may model the GUI-based application 102 beginning at the first initial state by generating a transition from the dummy initial state to the first initial state based on a first dummy action performed at the dummy initial state. The analysis module 104 may similarly model the GUI-based application 102 beginning at the second initial state by generating a transition from the dummy initial state to the second initial state based on a second dummy action performed at the dummy initial state.

Based on the modeling of the GUI-based application 102 described above, the analysis module 104 may be configured to generate the DFSM model 106 by dynamically crawling the GUI-based application 102 and performing the L* algorithm. In some embodiments, the analysis module 104 may be configured to generate the DFSM model 106 in accordance with methods 300, 400, 500, 600, and 700 described below with respect to FIGS. 3-7. As mentioned above, the DFSM model 106 may be used to test the GUI-based application 102 to find bugs or other problems that may be associated with the GUI-based application 102 performing as expected and desired.

Figure 2C:
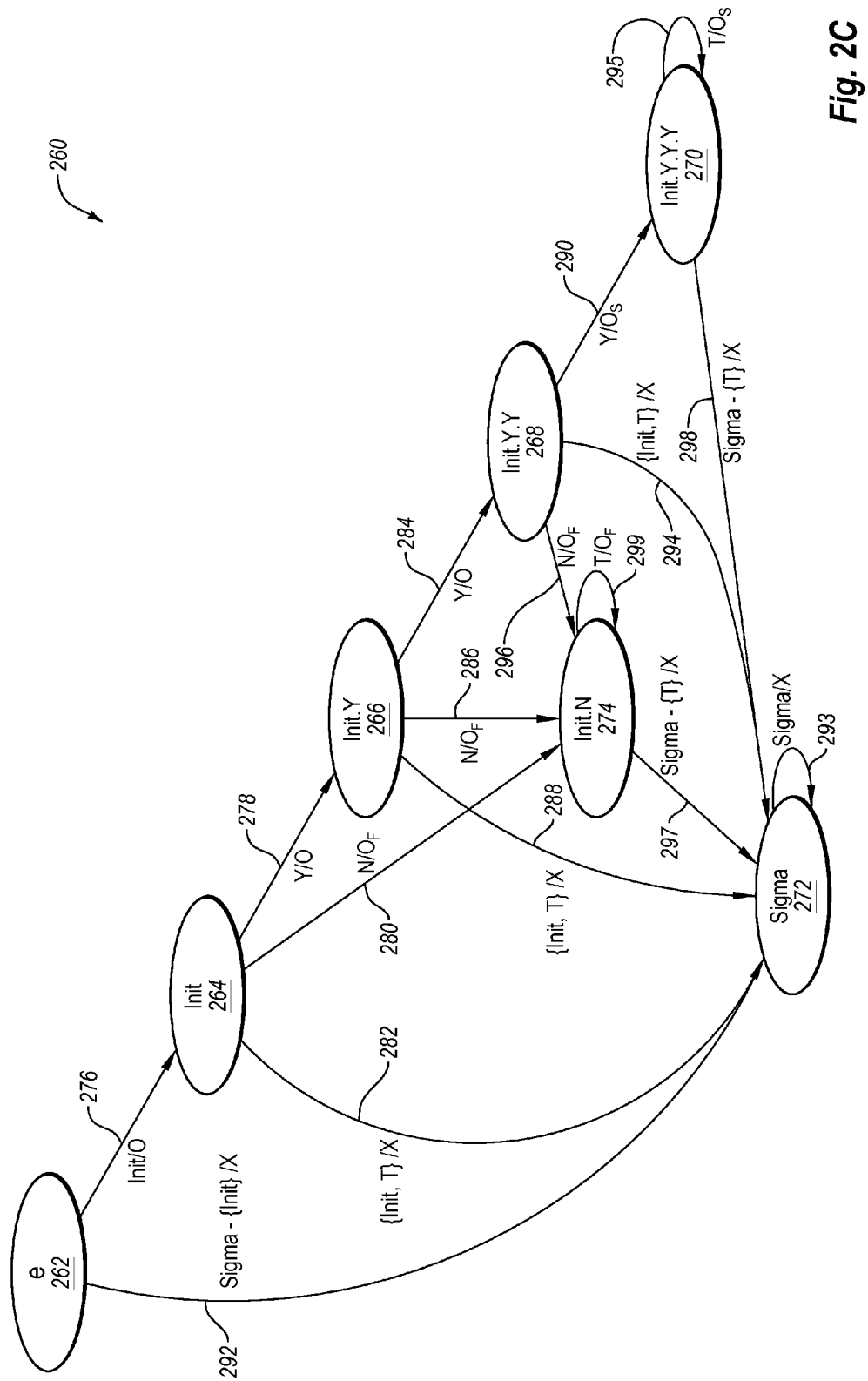
FIG. 2C is an example deterministic finite state machine (DFSM) that may be generated for the GUI-based application of FIG. 2A.

FIG. 2C is an example DFSM model 260 (referred to hereinafter as the "model 260") that may be generated for the sample application 202, in accordance with at least one embodiment of the present disclosure. The model 260 may include a dummy initial state 262, labeled as "e," that may act as the dummy initial state described above. The dummy initial state may be represented as being a response to a NULL or dummy action because no actual action in the sample application 202 may result in arriving at the dummy initial state 262.

The model 260 may include an initial state 264 that may correspond with the first-term state 244 and the first-term screen 214 described above. As described above with respect to FIG. 2B, launching the sample application 202 may result in the first-term screen 214 being displayed as an output. Accordingly, the model 260 may include a transition edge 276 that may indicate a transition from the dummy initial state 262 to the initial state 264. In the illustrated embodiment, the transition from the dummy initial state 262 to the initial state 264 is denoted by the I/O sequence of "Init/O" indicating that performing a launch action (denoted as "Init" and forming the label of the initial state 264) with respect to the sample application 202 may cause the sample application 202 to display or output the first-term screen 214 (denoted as "O").

The model 260 may include a dummy error state 272 and a transition edge 292 that may indicate a transition from the dummy initial state 262 to the dummy error state 272. In the illustrated embodiment, the transition from the dummy initial state 262 to the dummy error state 272 indicated by the transition edge 292 may be denoted by the I/O sequence "Sigma—{Init}/X," in which "Sigma" represents all the actions associated with the sample application 202 and "Sigma—{Init}" indicates that every action but "Init" is unavailable in the dummy initial state 262 to launch the sample application 202. Accordingly, performance of the unavailable actions "Sigma—{Init}" at the dummy initial state 262 may result in a transition to the dummy error state 272 (also indicated by the label "Sigma") and production of the dummy output "X".

The model 260 may further include subsequent states 266 and 268 that may be reached via one or more actions performed from the initial state 264. In the illustrated embodiment, the subsequent state 266 may correspond with the second-term state 246 and the second-term screen 216 described above. As indicated in FIG. 2B, the sample application 202 may transition to the second-term state 246 by tapping the "Yes" button associated with the "Yes" widget 224 of the first-term screen 216. Accordingly, the model 260 may include a transition edge 278 that may indicate a transition from the initial state 264 to the subsequent state 266 with a denoted I/O sequence "Y/O," where "O" indicates the generating of the second-term screen 216 as the output to tapping the "Yes" button. The subsequent state 266 may also be labeled by the input sequence "Init.Y" to denote an input sequence that may result in the subsequent state 266.

In the illustrated embodiment, the subsequent state 268 may correspond with the third-term state 248 and the third-term screen 218 described above. As indicated in FIG. 2B, the sample application 202 may transition from the second-term state 246 to the third-term state 248 by tapping the "Yes" button associated with the "Yes" widget 228 of the third-term screen 218. Accordingly, the model 260 may include a transition edge 284 that may indicate a transition from the subsequent state 266 to the subsequent state 268 with a denoted I/O sequence "Y/O," where "O" indicates the generating of the third-term screen 218 as the output to tapping the "Yes" button. The subsequent state 268 may also be labeled by the input sequence "Init.Y.Y" to denote an input sequence that may result in the subsequent state 268.

The model 260 may also include a main state 270 that may correspond with the main actions state 250 and the main actions screen 220 described above. As indicated in FIG. 2B, the sample application 202 may transition from the third-term state 248 to the main actions state 250 by tapping the "Yes" button associated with the "Yes" widget 232 of the third-term screen 218. Accordingly, the model 260 may include a transition edge 290 that may indicate a transition from the subsequent state 268 to the main state 270 with a denoted I/O sequence "Y/$O_s$," where "$O_s$" indicates the generating of the main actions screen 220 as the output to tapping the "Yes" button. The main state 270 may also be labeled by the input sequence "Init.Y.Y.Y" to denote an input sequence that may result in the main state 270.

Further, the model 260 may include a failure state 274. The failure state 274 may correspond with the agreement non-acceptance state 252 and the agreement non-acceptance screen 222 described above. As indicated in FIG. 2B, the sample application 202 may transition from the first-term state 244, the second-term state 246, or the third-term state 248 to the non-acceptance state 252 by tapping the "No" button of their associated "No" widget on the corresponding first-term screen 214, second-term screen 216, or third-term screen 218, respectively. Accordingly, the model 260 may include a transition edge 280 that may indicate a transition from the initial state 264 to the failure state 274, a transition edge 286 that may indicate a transition from the subsequent state 266 to the failure state 274, and a transition edge 296 that may indicate a transition from the subsequent state 268 to the failure state 274, each having a denoted I/O sequence "N/$O_F$." In the I/O sequence "N/$O_F$," "$O_F$" indicates the generating of the non-acceptance screen 222 as the output to tapping the associated "No" button. The failure state 274 may also be labeled by the input sequence "Init.N" to denote at least one of the input sequences that may result in the failure state 274.

A self-transition edge 295 at the main state 270 associated with an I/O sequence of "T/$O_s$," indicates staying in the main state 270 in response to actions "T" that may be available in the main actions state 250. Similarly, a self-transition edge 299 associated with an I/O sequence of "T/$O_F$" indicates staying in the failure state 274 in response to actions "T" that may be available in the non-acceptance state 252. As mentioned above, the main actions state 250 and/or the non-acceptance state 252 may include any number of other states and/or screens associated with the sample application 202 such that the main state 270 and/or the failure state 274 may also represent any number of states of the sample application 202.

The model 260 may include a transition edge 282 that may indicate a transition from the initial state 264 to the dummy error state 272. In the illustrated embodiment, the transition from the initial state 264 to the dummy error state 272 indicated by the transition edge 282 may be denoted by the I/O sequence "{Init, T}/X" because "Init" and "T" actions may be unavailable actions in the first-term screen 214 of the sample application 202, which may be associated with the initial state 264. Similarly, a transition edge 288 may indicate a transition from the subsequent state 266 to the dummy error state 272 and a transition edge 294 may indicate a transition from the subsequent state 268 to the dummy error state 272, both of which may also be indicated by the I/O sequence "{Init, T}/X." A self-transition edge 293 at the dummy error state 272 that is associated with an I/O sequence of "Sigma/X" indicates staying in the dummy error state 272 in response to any of the actions "Sigma."

As such, FIG. 2C illustrates an example DFSM model of the sample application 202 described with respect to FIGS. 2A and 2B that may be generated according to the present disclosure. In some embodiments, the generation of the DFSM model for the sample application 202 and other GUI-based applications such as the GUI-based application 102 may be based on the methods 300, 400, 500, 600, and 700 described below with respect to FIGS. 3-7. Modifications, additions, or omissions may be made to the DFSM model 260 described above. For example, the states and I/O sequences included and discussed are used for exemplary purposes and are not meant to necessarily include every state or I/O sequence that may be associated with the sample application 202, or any GUI-based application.

Figure 3A:
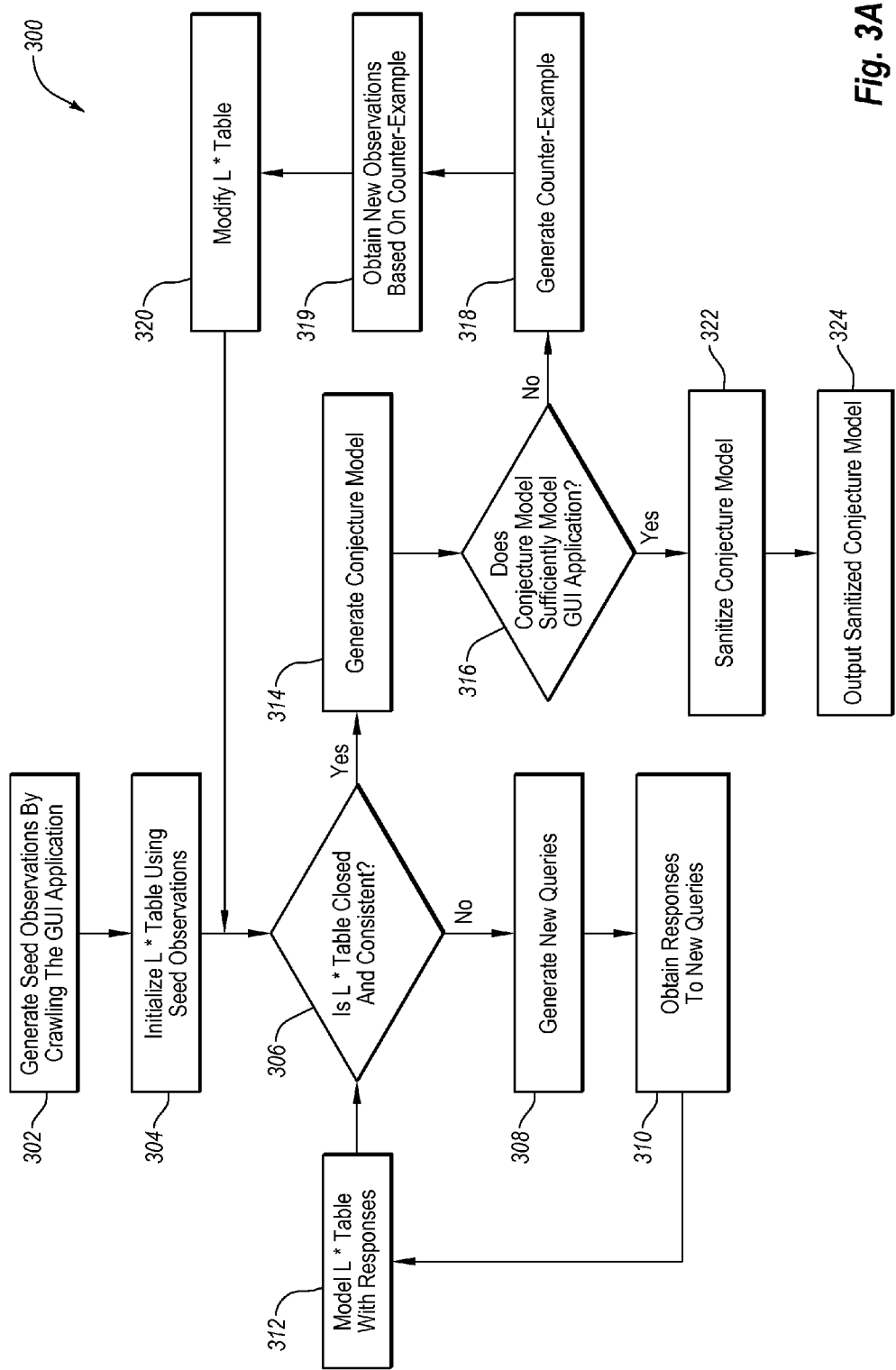
FIG. 3A is a flowchart of an example method of generating a DFSM model of a GUI-based application.

FIG. 3A is a flowchart of an example method 300 of generating a DFSM model of a GUI-based application, in accordance with at least one embodiment of the present disclosure. The method 300 may be implemented in some embodiments by an analysis module, such as the analysis module 104 of FIG. 1. For instance, the processor 108 of the analysis module 104 may be configured to execute computer instructions stored in the memory 110 to perform actions for generating a DFSM model of the GUI-based application 102, as represented by one or more of blocks of the method 300. Although illustrated as discrete blocks, various blocks may be divided into additional blocks, combined into fewer blocks, or eliminated, depending on the desired implementation.

The method 300 may begin, and at block 302, seed observations of the GUI-based application may be generated by crawling the GUI-based application. The crawling may be used to determine which actions are included in the GUI-based application such that those actions may be used by the L* algorithm as described above. By way of example, using nomenclature described above with respect to the sample application 202 where "Init" denotes the action of launching the sample application 202, "Y" denotes tapping a "Yes" button, "N" denotes tapping a "No" button, "T" denotes performing any other action in the main actions state 250 or the non-acceptance state 252, the crawling may be used to determine that the sample application includes the actions "Init," "Y," "N," and "T," which may be used by the L* algorithm.

One example of how the crawling may be executed is described in further detail below with respect to FIG. 4. As described below with respect to FIG. 4, the crawling may be performed by extending crawls such that prefix sequences and extensions of the prefix sequences are crawled during the same crawl. Crawling performed by extending crawls as indicated above and described in detail below with respect to FIG. 4 may be referred to herein as "preemptive crawling." In contrast, as mentioned above, traditional crawling may crawl the prefix sequences and their extensions during separate crawls, which may cause redundant crawling of the prefix sequences.

At block 304, the actions observed during crawling at block 302 may be used to initialize an L* algorithm observation table (referred to hereinafter as the "L* table"). For example, the actions "Init," "Y," "N," and "T" of the sample application 202 may be input in an L* table as actions that may be performed within the sample application 202. Table 1 below illustrates an example of an L* table that may be initialized with the actions "Init," "Y," "N," and "T."

TABLE 1

|     | Init | Y | N | T |
|-----|------|---|---|---|
| S   |      |   |   |   |
| S.I |      |   |   |   |

In Table 1 above, the row labels (recorded in the column on the far left) indicate various action sequences of the sample application 202. The action sequences indicated by the row labels may be divided into an "S" category or an "S.I" category, where the "S" category indicates observed sequences that may appear in the final DFSM model of the sample application 202 and the "S.I." category indicates extensions of the observed sequences of the "S" category that may be used to check the completeness of a conjectured DFSM model. Further, the column labels (indicated by the cells in the top row) indicate the actions, or sequences of actions, that may be available in the sample application 202.

The other cells record a representation of a resulting output of the sample application 202 to an action sequence formed by concatenating the actions in the row label and column label of that cell. In the illustrated example, because the L* table represented by Table 1 has recently been initialized, the cells other than the available input actions have not been populated because the L* algorithm has not begun to learn the behavior of the sample application 202 at this point.

At block 306, it may be determined whether the L* table is closed and consistent. In some embodiments, the L* algorithm may be performed with respect to the L* table to determine whether the L* table is closed and consistent, which may be indicated by the process performed by the L* algorithm converging. When the L* table is not closed and consistent, the method 300 may proceed to block 308, where the L* algorithm may generate, based on the L* table, one or more queries about the behavior of the GUI-based application. The queries may be generated such that answers to the queries may possibly make the L* table closed and consistent. The queries may include one or more actions compiled as a sequence of actions where the L* algorithm desires to know outputs of the GUI-based application in response to executing the sequences of actions of the queries.

For example, with respect to the sample application 202, at block 306 it may be determined that Table 1 is not closed and consistent because behavior of the sample application 202 is not yet populated in Table 1. Therefore, at block 308, the L* algorithm may generate one or more queries based on Table 1 to determine the behavior of the sample application 202. By way of example, at block 308, the L* algorithm may generate the following queries of input sequences of the sample application 202 to determine resulting outputs of the sample application 202: "Init," Init.Y," and "Init.N."

Returning to the general description of the method 300, at block 310, responses to the queries generated at block 308 may be obtained. In some embodiments, the responses to the queries may be obtained based on I/O sequences determined and saved (e.g., in a cache of the memory 110 of FIG. 1A) during the crawling performed at block 304. As explained in further detail below, the responses may have been already determined during preemptive crawling that may be performed at block 304, as explained with respect to FIG. 4. The preemptive crawling may thus reduce on-demand crawling, which may improve the efficiency of the method 300.

For example, with respect to the sample application 202, preemptive crawling may have crawled the following sequences of actions at block 304: "Init.Y.Y," "Init.Y.N," and "Init.N.T.T." The queries "Init" and "Init.Y" may be prefixes of the already crawled sequence "Init.Y.Y" and the query "Init.N" may be a prefix of the already crawled sequence "Init.N.T.T." Therefore, while crawling the sequences "Init.Y.Y," "Init.Y.N," and "Init.N.T.T," the queries "Init," Init.Y," and "Init.N" may also be crawled such that input/output sequences associated with the queries "Init," Init.Y," and "Init.N" may also be learned and observed. Accordingly, responses to the queries "Init," Init.Y," and "Init.N" may be obtained based off of the crawl performed at block 304 without needing to perform an on-demand crawl.

When one or more queries have not been previously crawled (e.g., have not been previously crawled at block 304) such that their respective responses have not been already determined, an on-demand crawl may be performed to determine responses to those queries. In some embodiments, the on-demand crawling performed may also include preemptive crawling where extensions of the queries may also be crawled. Therefore, not only responses to the queries may be determined, but also input/output sequences of the extensions of the queries may be determined and referred to at a later time, which may also reduce on-demand and redundant crawling.

Figure 5:
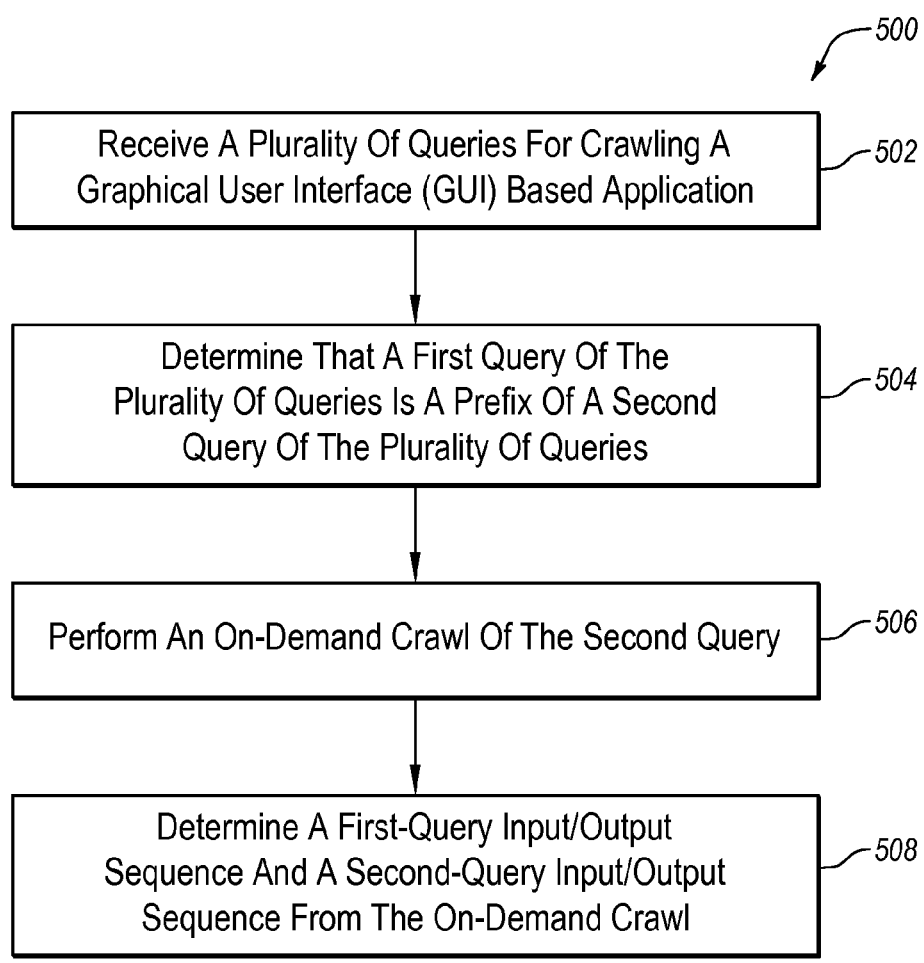
FIG. 5 is a flowchart of an example method of reducing redundant crawling of a GUI-based application.

In some embodiments, redundancy in the on-demand crawling may be reduced by determining whether any of the remaining queries whose responses have not been obtained based on a previous crawl are extensions of other remaining queries. In other words, it may be determined whether any of the remaining queries are prefixes of other remaining queries. As indicated above, when a query is an extension of another query, the query that is an extension query may be crawled at the same time as the query that is a prefix query. Therefore, the input/output sequence of the prefix query and the input/output sequence of the extension query may be determined and saved during the same on-demand crawl. As such, the responses to the extension query and the prefix query may be determined in a single crawl instead of during separate crawls, which may reduce redundant crawling. The reduction of redundant crawling by crawling prefix and extension queries during the same crawl may also be done in instances when input/output sequences from previous crawls are not used. FIG. 5 described below illustrates an example method 500 of reducing redundant crawling in this manner.

At block 312, the L* table may be modified and updated according to the I/O sequences obtained at block 310. For example, with respect to the sample application 202, Table 2 below illustrates an update of the L* table depicted by Table 1 based on the responses to the queries "Init," Init.Y," and "Init.N." In Table 2, "O" denotes an output associated with any of the first-term screen 214, the second-term screen 216, or the third-term screen 218, "O_F" denotes an output associated the non-acceptance screen 222, and "X" denotes the dummy error output described above.

TABLE 2

|         | Init | Y | N | T |
|---------|------|---|---|---|
| S       |      |   |   |   |
| e S.I   | O    | X | X | X |
| Init    | X    | O | O_F | X |
| Y, N, T | X    | X | X | X |

Returning to the general description of the method 300, the method 300 may return to block 306 after block 312 where the L* algorithm may be executed again with respect to the modified L* table to determine whether the modified L* table is now closed and consistent. Blocks 306, 308, 310, and 312 may be repeated any number of times until the L* table is deemed to be closed and consistent.

For example, at block 306, the L* algorithm may determine that Table 2 is not closed and consistent because of the responses recorded in its last two rows of the conjectured sequences are different than the responses recorded in the observed sequence. Accordingly, the L* algorithm ay generate the following queries at block 308: "Init.Y.Y," "Init.Y.N," and "Init.N.T." At block 310, the L* algorithm may obtain responses to queries based off of saved input/output sequences from a previous crawl and/or based off of an on-demand crawl. At block 312, the L* algorithm may modify Table 2 based on the responses to the queries to generate Table 3. In Table 3, the same nomenclature may be used as in Table 2 with an additional term "Sigma" included, where "Sigma" denotes the complete set of actions {Init, Y, N, T}.

TABLE 3

|  | Init | Y | N | T |
|---|---|---|---|---|
| S |  |  |  |  |
| e | O | X | X | X |
| Init | X | O | O_F | X |
| Y | X | X | X | X |
| S.I |  |  |  |  |
| Init.Y | X | O | O_F | X |
| N, T, Init.{Init, T}, Y.Sigma | X | X | X | X |
| Init.N | X | X | X | O_F |

In continuing the example with respect to the sample application 202, at block 306 it may be determined that Table 3 is not closed and consistent. Therefore, blocks 308, 310, and 312 may be repeated such that a query "Init.N.T.T" and its response may be generated and obtained at blocks 308 and 310. Table 4 below may be generated at block 312 based on the response to the query "Init.N.T.T." At block 306, Table 4 may be deemed as being closed and consistent.

TABLE 4

|  | Init | Y | N | T |
|---|---|---|---|---|
| S |  |  |  |  |
| e | O | X | X | X |
| Init | X | O | O_F | X |
| Y | X | X | X | X |
| Init.N | X | X | X | O_F |
| S.I |  |  |  |  |
| Init.Y | X | O | O_F | X |
| N, T, Init.{Init, T}, Y.Sigma, Init.N.{Sigma-T} | X | X | X | X |
| Init.N.T | X | X | X | O_F |

Returning to the general description of the method 300, when the L* table (e.g., Table 4) is deemed to be closed and consistent, the method 300 may proceed from block 306 to block 314. At block 314 a conjecture model may be generated by the L* algorithm based on the L* table. The conjecture model may be a DFSM model that is a conjecture of how the GUI-based application operates based on the closed and consistent L* table. For example, at block 314, a conjecture model of the sample application 202 may be generated based on Table 4 above. FIG. 3B illustrates an example DFSM conjecture model 350 of the sample application 202 that may be generated based on the Table 4.

At block 316, it may be determined whether the conjecture model sufficiently models the GUI-based application. An example of determining whether the conjecture model sufficiently models the GUI-based application is described with respect to a method 700 of FIG. 7 below. When the conjecture model does not sufficiently model the GUI-based application, the method 300 may proceed to block 318. At block 318, a counter example may be generated that may indicate a series of actions with respect to the conjecture model and the GUI-based application where the same result is not obtained. An example of generation of the counter example is also described with respect to FIG. 7.

For example, a comparison of the conjecture model 350 of FIG. 3B, with the DFSM model 260 of FIG. 2C indicates that the conjecture model 350 does not sufficiently model the sample application 202. Therefore, the conjecture model 350 and the sample application 202 may not yield the same result with respect to some sequences of actions. Accordingly, at block 316 it may be determined that the conjecture model 350 does not sufficiently model the sample application 202. At block 318 a counter-example that refutes the conjecture model 350 may be generated. For example, at block 318 a sequence of actions "Init.Y.Y.Y" may be generated as a counter-example that refutes the conjecture model 350.

Returning to the general description of the method 300, at block 319, observations of the GUI-based application (e.g., input/output sequences) may be obtained based on the counter-example. In some embodiments, the observations may be obtained based off of saved input/output sequences from a previous crawl and/or based off of an on-demand crawl. In some instances, the previous crawl and/or the on-demand crawl may perform preemptive crawling as indicated above. The observations may be used to modify the L* table at block 320 and the method 300 may return to block 306. Accordingly, one or more steps associated with blocks 306, 308, 310, 312, 314, 316, 318, 319, and 320 may be repeated until it is determined that the conjecture model sufficiently models the GUI-based application.

For example, with respect to the sample application 202, one or more input/output sequences may be obtained based on the counter-example "Init.Y.Y.Y" at block 319. At block 320, the Table 4 may be modified and the method 300 may return to block 306. Steps associated with blocks 306, 308, 310 and 312 may be repeated until an L* table that is closed and consistent, such as Table 5 below, is generated for the sample application 202. Table 5 may include the same nomenclature as Tables 1-4 above with an additional term "O_S" included, where "O_S" denotes an output associated with the main action screen 220 of the sample application 202.

TABLE 5

|  | Init | Y | Y.Y | N | T |
|---|---|---|---|---|---|
| S |  |  |  |  |  |
| e | O | X | X.X | X | X |
| Init | X | O | O.O | O_F | X |
| Y | X | X | X.X | X | X |
| Init.N | X | X | X.X | X | O_F |
| Init.Y | X | O | O.O_S | O_F | X |
| Init.Y.Y | X | O_S | O_S.X | O_F | X |
| Init.Y.Y.Y | X | X | X.X | X | O_S |
| S.I |  |  |  |  |  |
| Init.Y.Y.T | X | X | X.X | X | O_S |
| N, T, Init.{Init, T}, Y.Sigma, Init.N.{Sigma-T}, Init.Y.{T, Init}, Init.Y.Y.{T, Init}, Init.Y.Y.{Sigma-T} | X | X | X.X | X | X |
| Init.N.T, Init.Y.N, Init.Y.Y.N | X | X | X.X | X | O_F |

At block 314, a conjecture model of the sample application 202 may be generated based on Table 5. In the present example, the conjecture model generated based on Table 5 may be substantially equal to the DFSM model 260 of FIG. 2C. Therefore, the conjecture model may accurately reflect the behavior of the sample application 202 and may be determined as sufficiently modeling the sample application 202 at block 316.

Returning to the general description of the method 300, when it is determined that the conjecture model does sufficiently model the GUI-based application at block 316, the method 300 may proceed to block 322. At block 322, the conjecture model may be sanitized in which extraneous material included in the conjecture model may be removed. For example, the conjecture model may include a dummy error state that may be associated with unavailable actions at one or more states of the GUI-based application and at block 322, the dummy error state and the associated transition edges that lead to the dummy error state of the conjecture model may be removed from the conjecture model. At block 324, the sanitized conjecture model may be output as the GUI model of the GUI-based application.

Therefore, the method 300 may be used to generate a GUI model of a GUI-based application. Modifications, additions, or omissions may be made to the method 300 without departing from the scope of the present disclosure. For example, one skilled in the art will appreciate that for the method 300, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, often a few queries may be sufficient to determine that the L* table is not closed and consistent such that in some instances it may be determined at block 306 that the L* table is not closed and consistent based on responses to some of the queries generated previously at block 308 without needing all the responses. Therefore, obtaining responses to some of the queries, modifying the L* table based on those responses and checking whether the modified L* table is closed and consistent before crawling other queries may reduce on-demand crawling because it may be determined that the L* table is not closed and consistent based on the responses to some of the queries.

As such, in some embodiments, after responses to some of the queries generated at block 308 have been obtained (e.g., based on a crawl in block 304 or an on-demand crawl at block 310) at block 310, the method 300 may proceed to blocks 312 and 306 without crawling other queries of which responses may not have yet been obtained. By way of example, the above-described process may be performed after all the responses to queries have been obtained based on a previous crawl and before any on-demand crawls or after any number of on-demand crawls have been performed for the remaining queries.

Figure 4:
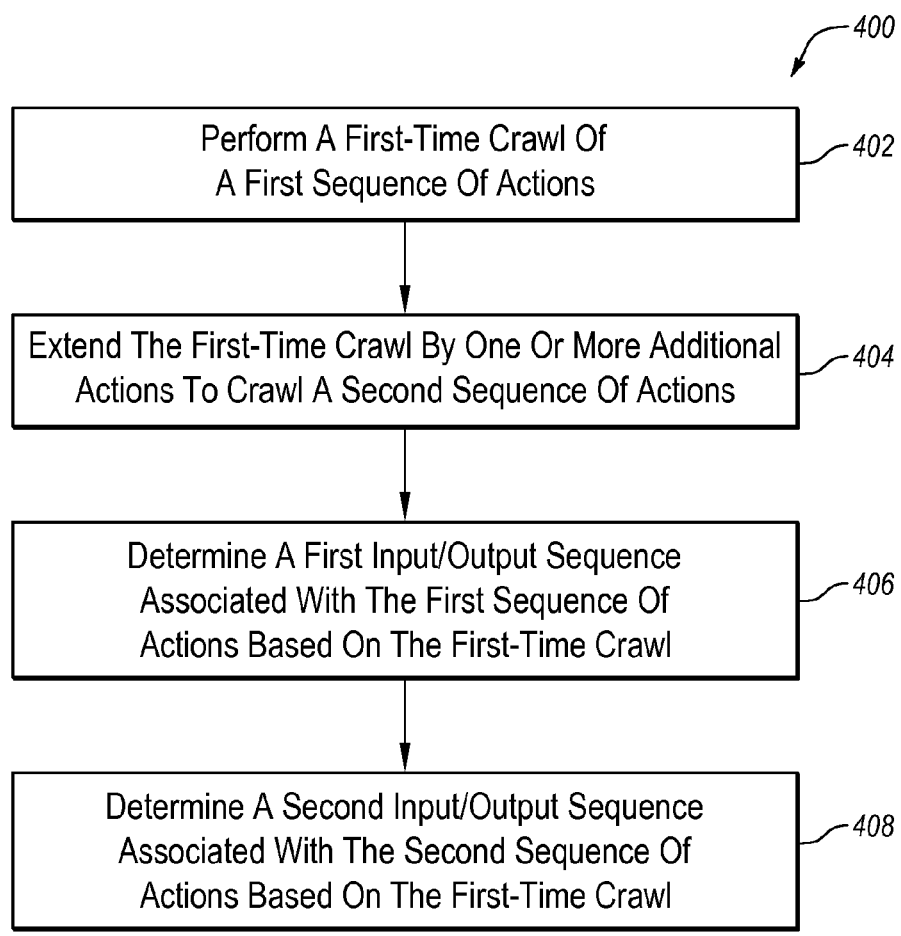
FIG. 4 is a flowchart of an example method of preemptively crawling a GUI-based application.

FIG. 4 is a flowchart of an example method 400 of preemptively crawling a GUI-based application, arranged in accordance with at least one embodiment of the present disclosure. As mentioned above, the method 400 may be used to perform one or more actions associated with blocks 302, 310, and 319 of the method 300 described above. The method 400 may be implemented in some embodiments by an analysis module, such as the analysis module 104 of FIG. 1. For instance, the processor 108 of the analysis module 104 may be configured to execute computer instructions stored in the memory 110 to perform actions for crawling the GUI-based application 102, as represented by one or more of blocks of the method 400. Although illustrated as discrete blocks, various blocks may be divided into additional blocks, combined into fewer blocks, or eliminated, depending on the desired implementation.

The method 400 may begin, and at block 402, a first-time crawl of a first sequence of actions may be performed. The first-time crawl may be the first time that the first sequence of actions has been crawled.

At block 404, the first-time crawl may be extended by one or more additional actions to crawl a second sequence of actions. Therefore, the first sequence of actions may be a prefix of the second sequence of actions. In some embodiments, the first-time crawl may be extended based on a randomized crawl extension process. In these or other embodiments, the first-time crawl may be extended based on a heuristic strategy.

For example, a simple deterministic heuristic strategy may include always extending the crawl a pre-decided number of actions (e.g., 1, 2, or 3 actions), in the hope that a new state would be encountered. Another more sophisticated (again deterministic) heuristic strategy that may be used may include computing a benefit function expressing the likelihood of discovering new states from the current state and crawling an additional step if the benefit for the current state is greater than a pre-decided threshold value. The benefit value may be computed based on the number of distinct sequences through which the current screen has been previously visited (the fewer the better) and the number of unexplored available actions on the current screen (the more the better). Alternatively, a simple randomized strategy similar to "flipping a coin" may be used to decide whether to stop or to crawl an extra step.

Alternatively or additionally, the first-time crawl may be extended based on a determination that a state of the GUI-based application observed during the first-time crawl has not been previously observed during the first-time crawl or another crawl of the GUI-based application. In some embodiments, the first-time crawl may be extended by at least two actions based on the determination that the state has not been previously observed. The extension by at least two actions may be based on the analysis that may be done by the L* algorithm. Therefore, in these and other embodiments, the second sequence of actions may include at least two more actions than the first sequence of actions.

In some embodiments, determining that the state has not been previously observed may be based on observing a screen that has not been previously observed during the first-time crawl or another crawl. In other embodiments, a screen may have been previously observed but may be associated with a state that has not been previously observed (also referred to as a "new state"). In these and other instances, it may be determined whether the observed screen is associated with a new state by crawling an action on the observed screen and observing the output of the action. The observed output may be compared with a previously observed output with respect to previously crawling the same action on the observed screen when the observed screen was previously observed. When the observed output is not the same as the previously observed output, it may be determined that a new state is being observed. There are many different ways to determine whether a new state has been observed. As such, the above are merely examples of determining when a new state has been observed and are not meant to be limiting.

At block 406, a first input/output sequence associated with the first sequence of actions may be determined based on the first-time crawl. In some embodiments, the first input/output sequence may be stored (e.g., in a cache in the memory 110 of FIG. 1A) such that the first input/output sequence may be referred to at a later time. For example, the saved first input/output sequence may be used at a later time to answer a query by the L* algorithm that includes the first sequence of actions. Therefore, on-demand crawling associated with the L* algorithm may be reduced.

Similarly, at block 408, a second input/output sequence associated with the second sequence of actions may also be determined based on the first-time crawl. In some embodiments, the second input/output sequence may be stored (e.g., in a cache in the memory 110 of FIG. 1A) such that the second input/output sequence may be referred to at a later time. For example, the saved second input/output sequence may be used at a later time to answer a query by the L* algorithm that includes the second sequence of actions. Therefore, on-demand crawling associated with the L* algorithm may be reduced.

Therefore, the method 400 may perform preemptive crawling by extending a crawl of the first sequence of actions to also crawl the second sequence of actions during the same crawl. As such, the same crawl may be used to determine both the first input/output sequence and the second input/output sequence. In contrast, traditional crawling may crawl the first sequence of actions in one crawl and then may crawl the entire second sequence of actions (which includes the first sequence of actions) in a separate crawl to determine the first input/output sequence and the second input/output sequence. As such, the method 400 may reduce redundant crawling as compared to other crawling methods. Additionally, as explained above, the method 400 may reduce on-demand crawling associated with the method 300 described above.

Modifications, additions, or omissions may be made to the method 400 without departing from the scope of the present disclosure. For example, one skilled in the art will appreciate that for the method 400, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, below is example psuedo-code that may implement the method 400 in which a state may be determined as being new based on a new screen being observed and where the crawling may continue at least two actions down from the new screen. It is understood that the below psuedo-code is merely one example implementation and is not a limiting example.

```
preEmptiveCrawl(app, crawlDB) {
    crawlStack ← null;
    currentPrefix ← null;
    /* events are triples of the form <prefix, action, nextActionState> */
    newEvent ← createNewEvent(currentPrefix, 'init', 'oneStep');
    crawlStack.push(newEvent);
    while(isNotEmpty(crawl Stack)) {
            event ← crawlStack.pop( );
            prefix ← event.getPrefix( );
            nextActionState ← event.getNextActionState( );
        newSequence ← prefix.addAction(event.getAction( ));
            if (hasBeenCrawled(newSequence, crawlDB)) continue;
            if (isNotEqual(currentPrefix, prefix)) {
                initialize(app);
                crawlOnApp(prefix, app);
                currentPrefix ← prefix;
            }
            crawlResult ← executeActionOnApp(event.getAction( ), app);
            addCrawlResult(crawlResult, newSequence, crawlDB);
            currentPrefix ← newSequence;
            currentScreen ← loadCurrentScreen(app);
            if (isNewScreen(currentScreen, crawlDB)) {
                nextActionState ← 'oneStep';
            } else {
                if (nextActionState == 'last') continue;
                else nextActionState ← 'last';
            }
            foreach(action in currentScreen) {
                newEvent ← createNewEvent(currentPrefix, action, nextActionState);
                crawlStack.push(newEvent);
            }
    }
}
```

In the above psuedo-code, a procedure "preEmptiveCrawl" takes as input a GUI-based application "app" and a database "crawlDB" of crawled sequences of "app" and their responses. As "app" is being crawled, the crawled sequences are added to "crawlDB." Additionally, the command "createNewEvent(prefix, action, nextActionState)" creates a new event object from parameters supplied for the variables "prefix," "action," and "nextActionState." Additionally, the object "crawlStack" is a typical stack implementation storing the events of "app" that are to be crawled. The events are added to and removed from the top of the stack using typical push( ) and pop( ) operations.

Further the notation "event.getXXX( )" denotes invocation of "get" methods on an "event" object that are configured to retrieve the values of each of their three constituent fields: "prefix," "action," and "nextActionState." The command "initialize(app)" is configured to "reset" "app" back to the state it was at its initial installation, e.g. by simply re-installing "app." The command "crawlOnApp(sequence, app)" is configured to execute the sequence of actions specified in the event sequence "sequence" on "app." Further, the command "executeActionOnApp(action, app)" is configured to execute a specified action "action" on "app," where it is assumed that "app" is currently in a state that allows for executing "action." The command "addCrawlResult( )" is configured to add the results of crawling a particular sequence of actions on "app" to "crawlDB" such that the input/output sequences of actions executed and output screens observed are saved to "crawlDB." Additionally, the loop "foreach(action in currentScreen)" is configured to iterate over each of the actions, "action" that may be available to be exercised on a given screen "currentScreen."

FIG. 5 is a flowchart of an example method 500 of reducing redundant crawling of a GUI-based application, arranged in accordance with at least one embodiment of the present disclosure. As mentioned above, the method 500 may be used to perform one or more actions associated with blocks 310 and 319 of the method 300 described above. The method 500 may be implemented in some embodiments by an analysis module, such as the analysis module 104 of FIG. 1. For instance, the processor 108 of the analysis module 104 may be configured to execute computer instructions stored in the memory 110 to perform actions for crawling the GUI-based application 102, as represented by one or more of blocks of the method 400. Although illustrated as discrete blocks, various blocks may be divided into additional blocks, combined into fewer blocks, or eliminated, depending on the desired implementation.

The method 500 may begin, and at block 502 a set of queries for crawling the GUI-based application may be received. The queries may each include a sequence of actions of the GUI-based application where behavior (e.g., input/output sequences) of the GUI-based application associated with the queries may be observed during a crawl of the GUI-based application. In some embodiments, the queries may be generated by an L* algorithm such as at block 308 of the method 300 described above.

At block 504, it may be determined that a first query of the queries is a prefix of one or more prefixes of a second query of the queries. At block 506, an on-demand crawl of the second query may be performed. The on-demand crawl of the second query may be performed without performing a separate on-demand crawl of the first query based on the first query being a prefix of the second query.

At block 506, a first-query input/output sequence of the first query and a second-query input/output sequence of the second query may be determined from the on-demand crawl and based on the determination that the first query is a prefix of the second query. The first-query input/output sequence may be used as a first response to the first query and the second-query input/output sequence may be used a second response to the second query. Therefore, the first response to the first query and the second response to the second query may be generated from the same on-demand crawl.

In some embodiments, an L* table of the L* algorithm may be modified based on the first-query input/output sequence and/or the second-query input/output sequence, such as described above with respect to block 312 of the method 300. Additionally, the L* algorithm may be executed with respect to the GUI-based application to determine whether the modified L* table, which may include the first-query input/output sequence and/or the second query input/output sequence, is closed and consistent, such as described above with respect to block 306 of the method 300. In these or other embodiments, the L* table may be modified and determined whether it is closed and consistent based on the first-query input/output sequence and/or the second-query input/output sequence before crawling other queries that may be included in the generated queries.

Accordingly, the method 500 may be used to reduce redundant crawling of a GUI-based application. Modifications, additions, or omissions may be made to the method 500 without departing from the scope of the present disclosure. For example, one skilled in the art will appreciate that for the method 500, the functions performed may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Figure 6:
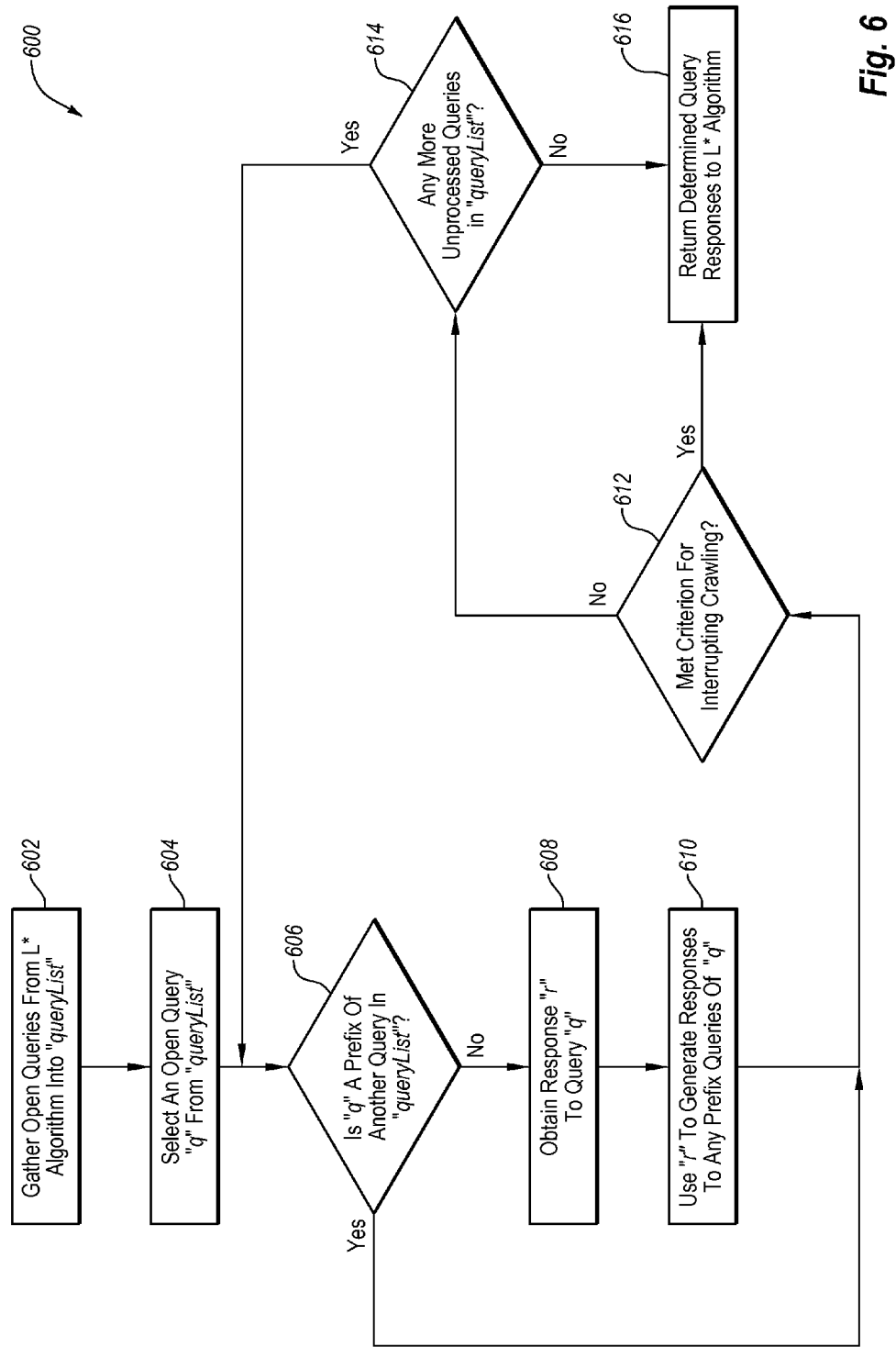
FIG. 6 is a flowchart of a method that may be an example implementation of the method of FIG. 5.

For example, FIG. 6 is a flowchart of a method 600 that may be an example implementation of the method 500, according to at least one embodiment described herein. The method 600 may begin at block 602 where open queries from an L* algorithm may be gathered into a list that may be referred to as "queryList." At block 604, an open query "q" may be selected from "queryList."

At block 606, it may be determined whether the query "q" is a prefix of one or more other queries that may be included in "queryList." When the query "q" is a prefix of another query, an on-demand crawl of the query "q" may not be performed specifically for the query "q" and the method 600 may proceed to block 612, which is explained in further detail below. When the query"q" is not a prefix of another query, the method 600 may proceed from block 606 to block 608.

At block 608, a response "r" to the query "q" may be obtained. In some embodiments, the response "r" may be obtained by crawling the query "q" within the GUI-based application. At block 610, the response "r" may be used to generate responses to any open queries of "queryList" that may be prefixes of the query "q."

At block 612, it may be determined whether one or more criteria for interrupting crawling may be met. As indicated above, in some embodiments, responses to all the open queries in "queryList" may not be obtained before returning already obtained responses to the L* algorithm for modification of the L* table. As such, at block 612 it may be determined whether to interrupt crawling of other open queries based on the criteria. When the criteria are met, the method 600 may proceed to block 616 where the query responses that have been determined may be returned to the L* algorithm. When the criteria are not met, the method 600 may proceed to block 614. The criteria for interrupting crawling may be based on a certain number of responses for a certain number of queries having been determined (e.g., 5) or a certain percentage (e.g., 50%) of responses to the queries obtained at block 602 having been determined.

At block 614, it may be determined whether there are any more unprocessed queries (e.g., queries for which responses have not been obtained) remaining in "queryList." When there are one or more unprocessed queries remaining in "queryList," the method 600 may return to block 604. When there are not any more unprocessed queries remaining in "queryList," the method 600 may proceed to block 616.

Therefore, the method 600 is an example implementation of the method 500 described above. Modifications, additions, or omissions may be made to the method 600 without departing from the scope of the present disclosure.

FIG. 7 is a flowchart of an example method 700 of determining whether a conjecture model sufficiently models an associated GUI-based application, arranged in accordance with at least one embodiment of the present disclosure. As mentioned above, the method 700 may be used to perform actions with respect to blocks 316 and 318 of the method 300 described above. The method 700 may be implemented in some embodiments by an analysis module, such as the analysis module 104 of FIG. 1. For instance, the processor 108 of the analysis module 104 may be configured to execute computer instructions stored in the memory 110 to perform actions, as represented by one or more of blocks of the method 700. Although illustrated as discrete blocks, various blocks may be divided into additional blocks, combined into fewer blocks, or eliminated, depending on the desired implementation.

The method 700 may begin at block 702, where a pseudo-random input sequence (referred to hereinafter as the "input sequence") associated with the GUI-based application may be generated. The input sequence may include any suitable set of actions that may be performed by the GUI-based application to determine the behavior of the GUI-based application in response to the input sequence.

At block 704 an abstract input sequence may be generated from the input sequence. The abstract input sequence may include a set of actions that may correlate to the actions of the input sequence and that may be used as actions in the conjecture model to determine sequences of actions of the GUI-based application as modeled by the conjecture model.

At block 706, the input sequence may be executed with respect to the GUI-based application to obtain an associated output sequence. At block 708, the abstract input sequence may be executed with respect to the conjecture model to obtain an associated abstract output sequence. At block 710, it may be determined whether the output sequence is substantially equivalent to the abstract output sequence.

When the output sequence is not substantially equivalent to the abstract output sequence, the method 700 may proceed to block 712 where the abstract input sequence may be output as a counter example, which may be used as the counter example generated at block 318 of the method 300 described above. When the output sequence is substantially equivalent to the abstract output sequence at block 710, the method 700 may proceed to block 713.

At block 713, it may be determined whether an input generation threshold has been reached. The input generation threshold may be associated with a pre-determined number of input sequences or a pre-determined time for generation of such sequences or some combination of these criteria, that are deemed to adequately test the different paths of the GUI-based application and the conjecture model in order to asses that the GUI-based application may be sufficiently modeled by the conjecture model. When the input generation threshold has not been reached, the method 700 may return to block 702. In contrast, when the input generation threshold has been reached, the method 700 may proceed to block 714, where the conjecture model may be deemed to sufficiently model the GUI-based application, which in some embodiments may cause the method 300 described above to proceed from block 316 to block 322.

Therefore, the methods 300, 400, 500, 600, and 700 may be used to extract and generate a DFSM model of the GUI-based application. The GUI model may accordingly be used to verify and test the behavior of the GUI-based application, and in some instances, may be used to troubleshoot and/or detect bugs associated with the GUI-based application.

One skilled in the art will appreciate that, for these and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

As indicated above, the embodiments described herein may include the use of a special purpose or general purpose computer (e.g., the processor 108 of FIG. 1) including various computer hardware or software modules, as discussed in greater detail below.

Further, as indicated above, embodiments described herein may be implemented using computer-readable media (e.g., the memory 110 of FIG. 1) for carrying or having computer-executable instructions or data structures stored thereon. Such computer-readable media may be any available media that may be accessed by a general purpose or special purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of crawling a graphical user interface (GUI) based application, the method comprising:

performing a first-time crawl of a first sequence of actions of a graphical user interface (GUI) based application, the first-time crawl being a first time that the first sequence of actions is crawled, the first sequence of actions being a prefix of a second sequence of actions that includes one or more additional actions that occur after the first sequence of actions, the actions included in the first sequence of actions and the second sequence of actions being inputs that cause the GUI-based application to move between states;

extending the first-time crawl by the one or more additional actions such that the second sequence of actions is crawled during the first-time crawl;

determining a first input/output sequence associated with the first sequence of actions based on the first-time crawl, the first input/output sequence including the first sequence of actions as a first input and including a first state as a first output;

determining a second input/output sequence associated with the second sequence of actions based on the first-time crawl, the second input/output sequence including the second sequence of actions as a second input and including, as a second output, a second state of the GUI-based application that is encountered during the first-time crawl in response to performance of the second sequence of actions; and generating a model for the GUI-based application based on the first input/output sequence and the second input/output sequence.

2. The method of claim 1, further comprising:
  determining that a state of the GUI-based application encountered during the first-time crawl of the first sequence of actions has not been previously observed; and
  extending the first-time crawl based on the determination that the state has not been previously observed.

3. The method of claim 2, wherein extending the first-time crawl includes extending the first-time crawl by at least two actions based on the determination that the state has not been previously crawled such that the second sequence of actions includes at least two more actions than the first sequence of actions.

4. The method of claim 2, wherein determining that the first state has not been previously observed is based on encountering a screen that has not been previously observed.

5. The method of claim 1, further comprising:
  executing an L* algorithm with respect to the GUI-based application;
  obtaining a response to a query generated by the L* algorithm using one or more of the first input/output sequence and the second input/output sequence;
  obtaining an output of the L* algorithm based on the response; and
  generating the model as a deterministic finite-state machine model for the GUI-based application based on the output of the L* algorithm.

6. The method of claim 5, further comprising:
  receiving a plurality of queries output by the L* algorithm, each of the plurality of queries including a sequence of actions of the GUI-based application;
  determining that a first query of the plurality of queries is a prefix of one or more prefixes of a second query of the plurality of queries;
  performing an on-demand crawl of the second query; and
  determining a first-query input/output sequence of the first query and a second-query input/output sequence of the second query from the on-demand crawl and based on the determination that the first query is the prefix of the second query such that a first response to the first query and a second response to the second query are both generated from the on-demand crawl.

7. The method of claim 6, further comprising:
  modifying an observation table of the L* algorithm based on one or more of the first-query input/output sequence and the second-query input/output sequence before crawling one or more other queries of the plurality of queries; and
  executing the L* algorithm with respect to the GUI-based application using the modified observation table to determine whether the modified observation table is closed and consistent before crawling the one or more other queries of the plurality of queries.

8. The method of claim 5, further comprising:
  receiving a plurality of queries output by the L* algorithm, each of the plurality of queries including a sequence of actions of the GUI-based application;
  obtaining a response to a query of the plurality of queries;
  modifying an observation table of the L* algorithm based on the response to the query before crawling one or more other queries of the plurality of queries; and
  executing the L* algorithm with respect to the GUI-based application using the modified observation table to determine whether the modified observation table is closed and consistent before crawling the one or more other queries of the plurality of queries.

9. The method of claim 8, further comprising generating a new plurality of queries when the modified observation table is not closed and consistent.

10. A method of crawling a graphical user interface (GUI) based application, the method comprising:
  receiving a plurality of queries for crawling a graphical user interface (GUI) based application, each of the plurality of queries including a sequence of actions of the GUI-based application, the actions included in the sequence of actions being inputs that cause the GUI-based application to move between states;
  determining that a first query of the plurality of queries is a prefix of one or more prefixes of a second query of the plurality of queries, the first query including a first sequence of actions, the second query including a second sequence of actions, and the first query being a prefix of one or more prefixes of the second query in that the second sequence of actions includes the first sequence of actions and one or more additional actions that occur after the first sequence of actions;
  performing an on-demand crawl of the second query without performing a separate on-demand crawl of the first query based on determining that the first query is a prefix of one or more prefixes of the second query; and
  determining a first-query input/output sequence of the first query and a second-query input/output sequence of the second query from the on-demand crawl and based on the determination that the first query is the prefix of the second query such that a first response to the first query and a second response to the second query are both generated from the on-demand crawl, the first-query input/output sequence including the first sequence of actions as a first input and including, as a first output, a first state of the GUI-based application that is encountered during the on-demand crawl in response to performance of the first sequence of actions, the second-query input/output sequence including the second sequence of actions as a second input and including, as a second output, a second state of the GUI-based application that is encountered during the on-demand crawl in response to performance of the second sequence of actions.

11. The method of claim 10, further comprising:
  generating the plurality of queries with an L* algorithm;
  modifying an observation table of the L* algorithm based on one or more of the first-query input/output sequence and the second-query input/output sequence; and
  executing the L* algorithm with respect to the GUI-based application using the modified observation table to determine whether the modified observation table is closed and consistent.

12. The method of claim 10, further comprising:
  generating the plurality of queries with an L* algorithm;
  modifying an observation table of the L* algorithm based on one or more of the first-query input/output sequence and the second-query input/output sequence; and
  executing the L* algorithm with respect to the GUI-based application using the modified observation table to determine whether the modified observation table is closed and consistent before crawling one or more other queries of the plurality of queries.

13. One or more processors configured to execute computer instructions to cause a system to perform operations for crawling a graphical user interface (GUI) based application, the operations comprising:

performing a first-time crawl of a first sequence of actions of a graphical user interface (GUI) based application, the first-time crawl being a first time that the first sequence of actions is crawled, the first sequence of actions being a prefix of a second sequence of actions that includes one or more additional actions that occur after the first sequence of actions, the actions included in the first sequence of actions and the second sequence of actions being inputs that cause the GUI-based application to move between states;

extending the first-time crawl by the one or more additional actions such that the second sequence of actions is crawled during the first-time crawl;

determining a first input/output sequence associated with the first sequence of actions based on the first-time crawl, the first input/output sequence including the first sequence of actions as a first input and including a first state as a first output;

determining a second input/output sequence associated with the second sequence of actions based on the first-time crawl, the second input/output sequence including the second sequence of actions as a second input and including, as a second output, a second state of the GUI-based application that is encountered during the first-time crawl in response to performance of the second sequence of actions; and generating a model for the GUI-based application based on the first input/output sequence and the second input/output sequence.

14. The one or more processors of claim 13, wherein the operations further comprise:

determining that a state of the GUI-based application encountered during the first-time crawl of the first sequence of actions has not been previously observed; and extending the first-time crawl based on the determination that the state has not been previously observed.

15. The one or more processors of claim 14, wherein extending the first-time crawl includes extending the first-time crawl by at least two actions based on the determination that the state has not been previously crawled such that the second sequence of actions includes at least two more actions than the first sequence of actions.

16. The one or more processors of claim 14, wherein determining that the first state has not been previously observed is based on encountering a screen that has not been previously observed.

17. The one or more processors of claim 13, wherein the operations further comprise:

executing an L* algorithm with respect to the GUI-based application;

obtaining a response to a query generated by the L* algorithm using one or more of the first input/output sequence and the second input/output sequence;

obtaining an output of the L* algorithm based on the response; and generating the model as a deterministic finite-state machine model for the GUI-based application based on the output of the L* algorithm.

18. The one or more processors of claim 17, wherein the operations further comprise:

receiving a plurality of queries output by the L* algorithm, each of the plurality of queries including a sequence of actions of the GUI-based application;

determining that a first query of the plurality of queries is a prefix of one or more prefixes of a second query of the plurality of queries;

performing an on-demand crawl of the second query; and determining a first-query input/output sequence of the first query and a second-query input/output sequence of the second query from the on-demand crawl and based on the determination that the first query is the prefix of the second query such that a first response to the first query and a second response to the second query are both generated from the on-demand crawl.

19. The one or more processors of claim 18, wherein the operations further comprise:

modifying an observation table of the L* algorithm based on one or more of the first-query input/output sequence and the second-query input/output sequence before crawling one or more other queries of the plurality of queries; and executing the L* algorithm with respect to the GUI-based application using the modified observation table to determine whether the modified observation table is closed and consistent before crawling the one or more other queries of the plurality of queries.

20. The one or more processors of claim 17, wherein the operations further comprise:

receiving a plurality of queries output by the L* algorithm, each of the plurality of queries including a sequence of actions of the GUI-based application;

obtaining a response to a query of the plurality of queries;

modifying an observation table of the L* algorithm based on the response to the query before crawling one or more other queries of the plurality of queries; and executing the L* algorithm with respect to the GUI-based application using the modified observation table to determine whether the modified observation table is closed and consistent before crawling the one or more other queries of the plurality of queries.

* * * * *